(No Model.)
J. A. BARNES.
PACKING FOR JOINTS.
No. 505,084. Patented Sept. 19, 1893.
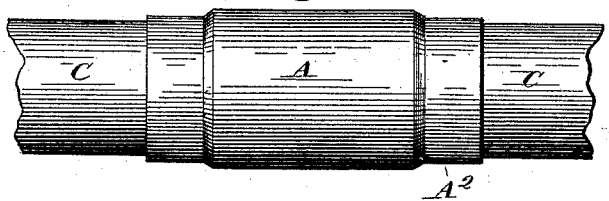
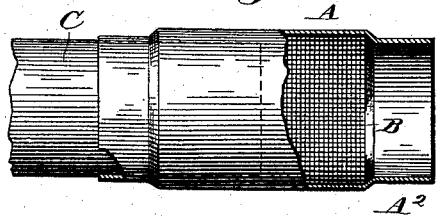 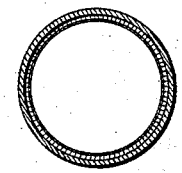
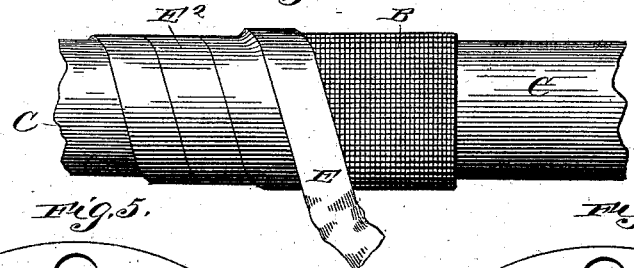
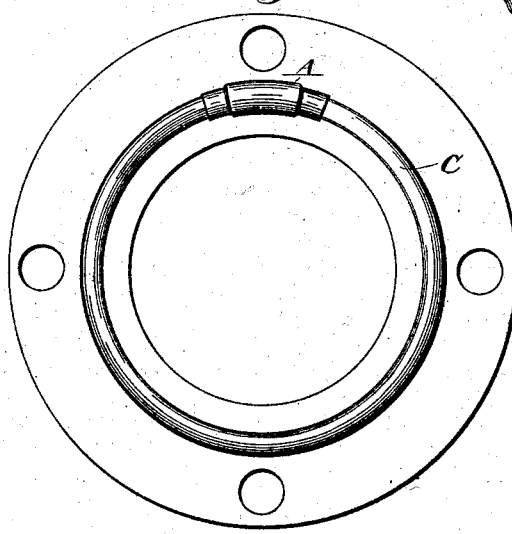 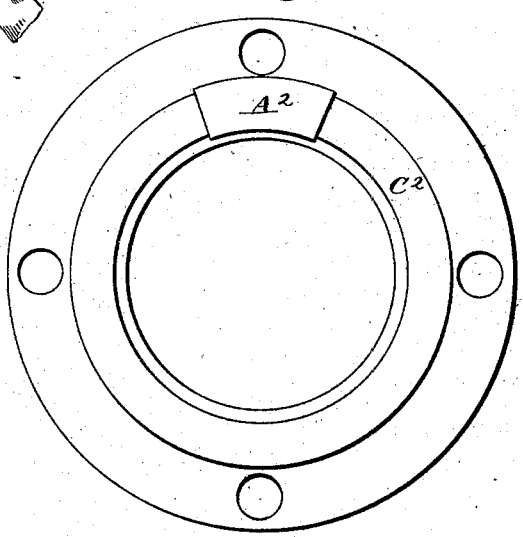
Witnesses:
C. C. Conn
C. Freeman
Inventor:
John A. Barnes

United States Patent Office.

JOHN A. BARNES, OF CLEVELAND, OHIO.

PACKING FOR JOINTS.

SPECIFICATION forming part of Letters Patent No. 505,084, dated September 19, 1893.

Application filed May 16, 1892. Serial No. 433,207. (No model.)

*To all whom it may concern:*

Be it known that I, JOHN A. BARNES, a citizen of the United States, residing at Cleveland, in the county of Cuyahoga and State of Ohio, have invented certain new and useful Improvements in Steam-Joint Packing, of which the following is a full, clear, and exact description.

The present invention has relation to that class of steam packing or gaskets for hand holes, man-holes, cylinder heads, and in other places, where a packing of this description would be found useful, and it consists in a packing constructed substantially as shown in the drawings and hereinafter described and claimed.

In the accompanying drawings c. represents the core of rubber compound or other suitable elastic material. To make it sufficiently strong to resist the pressure of the steam and prevent blowing out I make the core with a woven fabric insertion which possesses the requisite strength and durability for the purpose intended. In order to secure the compression of the packing more readily, the core c may be made hollow. Although it is considered materially advantageous to have the core made hollow, a solid core may be used, but possibly not with as good results.

The construction, application and advantages of my coupling, for connecting the ends of the packing together, will be explained hereinafter.

In the accompanying drawings, Figure 1, is an outside view of the coupling and core, with the ends of the core butted together within the coupling, and the contracting overhanging ends of the coupling extending out onto the cores. Fig. 2, is an end view of the coupling cut through the center. Fig. 3, is a sectional view of the coupling band, the outer packing band and contracting ends. Fig. 4, is a view showing the method of making the coupling by winding the core, and coupling with a tape. Fig. 5, shows the packing laid on one surface of a man hole plate, just after it has been coupled together, and before the other surface has been connected and clamped or screwed together. Fig. 6, illustrates the flattened appearance of packing core and coupling after the joint has been properly made, and the two plates have been tightened together, thus changing from a round core to a flattened one, the degree of flattening depending on the nearness of contact of the plates.

My invention is an improvement in packing for steam joints and in the art of making gaskets, &c. The usual method of packing joints of this class is to cut the gasket from a sheet of packing making a large waste of material, or by cutting the material into strips and cementing or vulcanizing the ends together on forms at the place of their manufacture. This method is expensive and tedious. Then again those who use this class of packing, are obliged to carry more or less of a variety of sizes on hand, as many different sizes as there are joints of various sizes to be packed, and dealers are obliged to carry in stock numerous and unsalable sizes.

One of the important features of my invention is to overcome this inconvenience and expense to a very large degree, and to enable dealers and users to limit their stock to about three sizes of core and couplings, more than equaling hundreds of sizes of the old style, with absolutely no waste or unsalable stock, for the smallest pieces can be coupled together and used. I find that by using an elastic core, either hollow or solid, as the case may demand, of three eighths, one half and five eighths inches diameter, together with my coupling, I am able to pack almost any joint of the usual dimensions. Instead of having the core made to conform to packings of different shapes, lengths and widths, I cut from the roll of core a length sufficient to go around and lay on the joint to be packed, cutting the ends off square.

It is very important that the ends are securely coupled, also that the coupling afford good packing qualities to prevent them from blowing out under pressure. To accomplish this I use a strong band either perforated or roughened on the inside as shown at B, Figs. 2, 3, and 4, made of any suitable material, that would be firm enough to hold the ends of the packing, after being inserted, in a firm position. I prefer that it be made of closely woven wire cloth made of fine wire, as its loose nature gives the joint some flexibility, especially desirable when the gasket is to be made a small size. A solid band can be used, but would require much more care in handling and adjusting on the joint to be packed, and would be rigid, instead of flexible and yielding as a woven band would be. This band may or may not be fastened at its connecting edges. If fastened I make the band somewhat smaller at its inside diameter, than the outside diameter of the elastic core to be inserted into it, so that the elasticity of the core will cause one to adhere firmly to the other. I also make the coupling and leave the connecting edges unfastened, relying on its outer elastic covering, A, Figs. 2 and 3, to aid it in hugging the elastic core after it has been inserted.

On the outside of the coupling band I put a covering of elastic material A Figs. 2 and 3, which aids in contracting the inside band, if the edges have been left unfastened and also acts as a packing between the outside of the band and the joint to be packed. To allow the bare inner coupling band to come in contact with the joint face, and act as part of the packing, might not give good results. This elastic outside coupling band is made to extend over the ends of the inside coupling band as shown at $A^2$ Figs. 1, and 3, so as to securely cover the ends of the inner coupling band and also hug the core C Figs. 1 and 3 and $E^2$ Fig. 4 by its contraction and friction, assisting to keep the ends within the coupling. This outer covering may be put on the inner band in the shape of a tube under expansion, so that it will be free to contract when an opportunity is afforded or may be made of spirally wound prepared tape E, Fig. 4, lapping or butting the edges as shown.

Another important feature of my invention is in the perforated coupling band or roughening the inside of it, so that it may firmly embed itself in the elastic core when both are pressed.

I do not wish to be confined to the detail construction and combination just described and illustrated, as many slight variations could be made by ordinary mechanical skill.

The operation of my invention is as follows: I lay the core rope around the face of joint to be packed, keeping about one quarter of an inch from the inside shoulder or opening, and cutting the ends off square, so that the packing will go around the plate and meet nicely. Afterward force each end into the ends of the elastic covered coupling band, so that they will come together about half way in it, and arrange the protruding ends of the elastic covering or coupling band to cover ends and also hug the core so that the tendency of the coupling will be to draw together and hold the ends of the core in the coupling. The plates or joints are then screwed or clamped up and the core together with the coupling band is flattened. In doing this the perforated band becomes partially, if not wholly embedded in the elastic core, tightly holding the ends together and at the same time the elastic covering of the band is forced between the plates and the band securely packing it.

The above packing described may be round, oval, square or any other preferred shape in cross section, and any diameter as found most desirable such changes coming within ordinary mechanical skill, and I therefore reserve the right to make them without departing from the principle of my invention.

Having fully described my invention, I claim—

1. The combination in a joint packing, of a core of elastic material, with or without cotton duck or other insertion, and a coupling perforated or roughened on its inside, and covered on its outside with a suitable material, whereby the elasticity of either the core or the coupling or both will cause each to adhere tightly to the other, and whereby on pressing the coupling and core, one will become partially or wholly embedded in the other, substantially as described.

2. The combination of a core of elastic material and a coupling covered on its outside with a suitable material, said covering extending over the ends of the coupling onto the core, and by its contraction, holding the ends of the packing within the coupling, substantially as described.

3. A steam joint packing, consisting of a core of elastic material and a coupling covered on the outside with a suitable material, said coupling having its ends protected or packed by the extension of the covering, substantially as and for the purpose described.

JOHN A. BARNES.

Witnesses:
LIZZIE COUGHLIN,
H. E. BARNES.